(12) United States Patent
Wang et al.

(10) Patent No.: US 9,751,654 B2
(45) Date of Patent: Sep. 5, 2017

(54) THERMOPLASTIC CONTAINERS WITH IMPROVED AESTHETICS

(71) Applicant: The Procter & Gamble Company, Cincinnati, OH (US)

(72) Inventors: Ping Wang, Beijing (CN); Liang Yang, Beijing (CN); Chunfang Song, Beijing (CN)

(73) Assignee: The Procter & Gamble Company, Cincinnati, OH (US)

(*) Notice: Subject to any disclaimer, the term of this patent is extended or adjusted under 35 U.S.C. 154(b) by 101 days.

(21) Appl. No.: 14/460,501

(22) Filed: Aug. 15, 2014

(65) Prior Publication Data
US 2015/0048153 A1 Feb. 19, 2015

(30) Foreign Application Priority Data

Aug. 16, 2013 (WO) .................. CN2013/081626
Jul. 16, 2014 (WO) .................. CN2014/082307

(51) Int. Cl.
| | | |
|---|---|---|
| B29C 49/00 | (2006.01) | |
| B65D 1/40 | (2006.01) | |
| B29C 49/22 | (2006.01) | |
| B29C 49/04 | (2006.01) | |
| B29C 49/06 | (2006.01) | |
| B32B 7/12 | (2006.01) | |
| B32B 27/08 | (2006.01) | |
| B32B 27/18 | (2006.01) | |
| B32B 27/32 | (2006.01) | |
| B29L 31/00 | (2006.01) | |
| B29K 23/00 | (2006.01) | |
| B29K 105/00 | (2006.01) | |

(52) U.S. Cl.
CPC ............ *B65D 1/40* (2013.01); *B29C 49/0005* (2013.01); *B29C 49/04* (2013.01); *B29C 49/06* (2013.01); *B29C 49/22* (2013.01); *B32B 7/12* (2013.01); *B32B 27/08* (2013.01); *B32B 27/18* (2013.01); *B32B 27/32* (2013.01); *B32B 27/322* (2013.01); *B29C 2049/001* (2013.01); *B29K 2023/06* (2013.01); *B29K 2023/10* (2013.01); *B29K 2023/12* (2013.01); *B29K 2105/0005* (2013.01); *B29K 2105/258* (2013.01); *B29K 2995/0073* (2013.01); *B29L 2031/712* (2013.01); *B32B 2270/00* (2013.01); *B32B 2307/406* (2013.01); *B32B 2307/412* (2013.01); *B32B 2307/414* (2013.01); *B32B 2307/518* (2013.01); *B32B 2307/714* (2013.01); *B32B 2439/00* (2013.01)

(58) Field of Classification Search
CPC .................. B29C 49/0005; B29C 2049/001
See application file for complete search history.

(56) References Cited

U.S. PATENT DOCUMENTS

| | | | |
|---|---|---|---|
| 4,357,288 A * | 11/1982 | Oas ................. | B29C 45/0001 264/40.6 |
| 4,879,331 A | 11/1989 | Endo et al. | |
| 5,247,019 A | 9/1993 | Cozens et al. | |
| 5,397,610 A | 3/1995 | Odajima | |
| 5,502,095 A | 3/1996 | Ueshima et al. | |
| 5,708,084 A | 1/1998 | Hauenstein et al. | |
| 5,728,347 A | 3/1998 | Collette et al. | |
| 6,013,715 A | 1/2000 | Gornowicz et al. | |
| 6,013,723 A | 1/2000 | Akao | |
| 6,406,661 B1 | 6/2002 | Schloss | |
| 6,417,293 B1 | 7/2002 | Chorvath et al. | |
| 6,465,552 B1 | 10/2002 | Chorvath et al. | |
| 7,019,048 B2 | 3/2006 | Brehmr | |
| 7,470,732 B2 | 12/2008 | Hobbs | |
| 7,989,558 B2 | 8/2011 | Ofer | |
| 8,268,212 B2 * | 9/2012 | Criel ............... | B29C 47/0066 264/150 |
| 8,414,988 B2 * | 4/2013 | Sun ................. | B29C 49/06 264/532 |
| 8,535,770 B2 * | 9/2013 | Wang ............... | B29D 22/003 428/34.5 |
| 2003/0175499 A1 | 9/2003 | Phillips | |
| 2004/0191492 A1 | 9/2004 | Reilly | |
| 2005/0129888 A1 | 6/2005 | Kwon | |
| 2005/0249904 A1 * | 11/2005 | Batlaw ............. | B29B 11/08 428/35.7 |
| 2006/0199887 A1 | 9/2006 | Liang | |
| 2008/0038500 A1 * | 2/2008 | Page ............... | B29C 49/6418 428/36.92 |
| 2008/0045638 A1 | 2/2008 | Chapman | |
| 2008/0113132 A1 | 5/2008 | Lungershausen | |
| 2008/0167597 A1 * | 7/2008 | Dougherty ........ | C08L 23/06 604/12 |

(Continued)

FOREIGN PATENT DOCUMENTS

| | | | | |
|---|---|---|---|---|
| CN | 102002217 A | 4/2011 | | |
| CN | WO 2012062215 A1 * | 5/2012 | ........... | B65D 1/40 |
| EP | 0456929 A2 | 11/1991 | | |
| JP | H04-336224 | 11/1990 | | |
| JP | H08-091341 | 4/1996 | | |
| JP | 2008-279662 | 11/2008 | | |

OTHER PUBLICATIONS

U.S. Appl. No. 14/254,949, filed Apr. 17, 2014, Wang et al.
U.S. Appl. No. 14/254,954, filed Apr. 17, 2014, Wang et al.
PCT International Search Report, dated Oct. 27, 2014, 12 pages.
PCT International Search Report, dated Dec. 2, 2015, 51 pages.
AZoM, "Low density polyethylene—LDPE", p. 103, May 11, 2001, http://www.azom.com/article.aspx?ArticleID=428.

*Primary Examiner* — Robert B Davis
(74) *Attorney, Agent, or Firm* — Charles R Ware; Jeffrey V Bamber

(57) ABSTRACT

A thermoplastic material and an additive that has a relatively low surface tension, allows for blow molding processing conditions that provides containers with a smooth exterior surfaces to enhance aesthetics.

12 Claims, No Drawings

(56) References Cited

U.S. PATENT DOCUMENTS

| | | |
|---|---|---|
| 2008/0249211 A1 | 10/2008 | Smink et al. |
| 2009/0170984 A1 | 7/2009 | Blum |
| 2009/0318593 A1 | 12/2009 | Stoll |
| 2010/0301525 A1 | 12/2010 | Price et al. |
| 2013/0307198 A1 | 11/2013 | Wang et al. |
| 2014/0319013 A1* | 10/2014 | Wang ................. B65D 1/40 206/524.6 |
| 2014/0319014 A1* | 10/2014 | Wang ................. B29C 49/0005 206/524.6 |

* cited by examiner

THERMOPLASTIC CONTAINERS WITH IMPROVED AESTHETICS

FIELD OF THE INVENTION

The present invention relates to a thermoplastic container and a process for making the same.

BACKGROUND OF THE INVENTION

Blow molded containers made of thermoplastic materials have been used to package a wide variety of consumer products, such as cosmetics, shampoo, laundry, and food. For such containers, having a smooth exterior surface is appealing to users as it generally enhances aesthetics, e.g., improved glossiness. Such a smooth exterior surface of a container is mainly a result of the impression of the inner surface of the mold used in shaping the molded container during a blow molding process. While a smooth mold inner surface is desirable for producing containers with improved aesthetics, this requirement poses challenges including compromising ventilation during the blow molding process.

In the blow molding process, ventilation is crucial for container quality. Ventilation allows air between the parison (or preform) of plastic and the mold to escape when the plastic expands in the mold cavity. Poor venting can cause air entrapment between the expanding plastic and the mold to prevent the plastic from fully contacting the mold. This leads to unsightly deformations in the formed container. Moreover, poor venting leads to a significant temperature build-up in the mold cavity, which can cause issues like sticking of the plastic onto the mold or burn marks of the plastic (i.e., the small dark brown or black discolorations on the molded container due to excess heat). These issues are particularly problematic for thermoplastic materials like polyethylene (PE) or polypropylene (PP) because such materials generally have a lower melting point and are more likely to stick onto a mold (as compared to materials like polyethylene terephthalate (PET)). In order to solve the above issues caused by poor venting, the prior art uses molds having a rough inner surface. Micropores on these rough molds (typically made by sandblasting) allow air to migrate through the micropores to the mold vents as the plastic inflates thereby reducing the air pressure (between the expanding plastic and mold) as well as mitigating the temperature build-up in the mold cavity. However, a rough mold leads to an undesired rough surface of the formed container.

Thus, there is a need to provide improved exterior surface smoothness (thereby improving aesthetics) to containers made from thermoplastic materials having a lower melting point. In particular, the present invention enables the use of a smooth mold to produce a container from thermoplastic materials having a lower melting point.

It is another advantage of the present invention to utilize the same mold to produce a variety of containers from different thermoplastic materials each having different melting points (which traditionally require different molds of varying degrees of smoothness).

It is another advantage of the present invention to provide a container made under relatively high processing temperature whilst avoiding the formation of burn marks.

It is yet another advantage of the present invention to provide a container that has reduced crystallinity and thus has improved surface smoothness.

It is even yet another advantage of the present invention to provide a container whilst avoiding the formation of flow line defects to the exterior surface of the container.

It is even yet another advantage of the present invention to provide a container that is easy to open, i.e., requiring a relatively low torque to open the container.

SUMMARY OF THE INVENTION

In one aspect, the present invention is directed to a blow molding process of making a container, comprising the steps of:
  a) affixing a precursor container form into a blow molding mold, wherein the precursor container form is a parison or preform,
    i) wherein the precursor container form comprises a layer, wherein the layer comprises:
      1) from about 86% to about 99.99%, by weight of the layer, of a thermoplastic material selected from the group consisting of polyethylene (PE), polypropylene (PP), and a combination thereof; and
      2) from about 0.01% to about 5%, by weight of the layer, of an additive, wherein the additive has a Surface Tension Value of from about 0.1 to about 50 m*N/m; and
    ii) wherein the mold comprises an inner surface configured to receive the expandable precursor container form, wherein at least a portion of the mold has a SPI finish standard selected from the group consisting of A-1, A-2, A-3, B-1, B-2, and B-3; and
  b) blowing into the precursor container form as to expand the precursor container form against the inner surface of the mold thereby forming the container.

In another aspect, the present invention is directed to a container obtained by the process.

In yet another aspect, the present invention is directed to the use of a mold for blow molding a PE container, wherein at least a portion of the mold has a SPI finish standard selected from the group consisting of A-1, A-2, A-3, B-1, B-2, and B-3.

DETAILED DESCRIPTION OF THE INVENTION

In the present invention, it has been surprisingly found that certain additives can be used to modify thermoplastic materials having a lower melting point, thereby allowing for blow molding conditions that yield molded containers having improved exterior surface. Without wishing to be bound by theory, it is believed that due to its relatively low surface tension, the selected additive tends to accumulate on the surface of the thermoplastic material and thereby isolates at least a portion of the thermoplastic material from the mold cavity as well as from the mold, i.e., functioning as a "isolator" for the thermoplastic material (this "isolator" does not have to be a whole coherent piece). This isolation function provided by the additive mitigates an excessive temperature increase of the thermoplastic material along with the temperature increase of the mold cavity. Also, it prevents at least a portion of the thermoplastic material from sticking onto the mold, i.e., reduces the tendency of the material sticking onto the mold. That is to say, the thermoplastic material and additive of the present invention can be processed under a higher processing temperature without causing sticking issues or burn marks. Therefore, for thermoplastic materials having a lower melting point, the present invention allows for the use of a smooth mold in the blow molding process and thus produces a container with improved surface smoothness.

Moreover, by mitigating an excessive temperature increase of the thermoplastic material, the addition of the additive avoids the formation of burn marks, even under a higher processing temperature. Also, by presenting on the surface of the thermoplastic material, the additive to some extent functions as a slippery agent and thereby enables an easy-opening of the formed container, i.e., the container requires a relatively low torque to unscrew a cap from the container.

DEFINITIONS

As used herein, the term "rough" refers to the surface of a mold that is sandblasted or the surface of a blow molded container from the sandblasted mold. The term "smooth" refers to the surface of a mold that is not sandblasted or the surface of a blow molded container from the non-sandblasted mold. The surface as referred to herein is either the inner surface of a mold (i.e., the portion of a mold forming the blow molded container) or an exterior surface of a container. Both the surface smoothness of the container and the mold can be measured by Roughness Average (Ra), which is described hereinafter.

As used herein, the term "polish" means smoothening a surface by rubbing, and the term "sandblast" means etching a surface by applying a blast of air carrying sand at high velocity to the surface. Both the polish and sandblast herein are particularly related to treatments applied to a mold surface, thus achieving a desired mold finish. The term "mold finish", as used herein, refers to the surface texture and/or smoothness of the inner surface of a mold. SPI mold finish standard is a widely accepted standard in the industry for defining the polishing standard on mold finish and is used herein. SPI mold finish standard defines different grades regarding surface smoothness for mold finish, including: A-1, A-2, A-3, B-1, B-2, B -3, C-1, C-2, C-3, D-1, D-2, and D-3, in which the standard starting with letter A refers to a smooth surface, the standard starting with letter B refers to a less smooth surface, the standard starting with letter C refers to a rough surface, and the standard starting with letter D refers to a very rough surface. Typically, molds having finish standards A or B are polished, and molds having finish standards C or D are first polished and then sandblasted. The numbers 1, 2, and 3 indicate increasingly rough surfaces.

As used herein, the term "surface tension" refers to a contractive tendency of the surface of a liquid that allows it to resist an external force. The surface tension herein is measured in m*N/m, the force in m*N required to break a film of length 1 meter. The surface tension data of certain example materials tested at 25° C. are described hereinafter.

As used herein, the term "layer" means a macro-scale layer of the material forming a container. Typically, the macro-scale layer has a thickness of from about 0.01 mm to about 10 mm, alternatively from about 0.1 mm to about 5 mm, alternatively from about 0.2 mm to about 1 mm.

As used herein, the term "blow mold" refers to a manufacturing process by which hollow cavity-containing plastic containers, preferably suitable for containing compositions, are formed. In general, there are three main types of blow molding: extrusion blow molding (EBM), injection blow molding (IBM), and injection stretch blow molding (ISBM). The term "precursor container form", as used herein, refers to the intermediate product form of plastic that is affixed into a blow molding mold and blown with air so as to expand against the inner surface of the mold to form the final container. The precursor container form is either a parison or a preform.

As used herein, the term "processing temperature" refers to the temperature of the mold cavity during the blow step of the blow molding process. During the blow step, the temperature of the material will eventually approach the temperature of the mold cavity, i.e., the processing temperature. The processing temperature is typically higher than the melting point of the material. Different thermoplastic materials typically require different processing temperatures, depending on factors including: melting point of the material, blow molding type, etc. The processing temperature is much higher than the mold temperature which is typically from about 10 to 30° C. (such a relatively low mold temperature is maintained by the cooling water flowing in the mold).

As used herein, the term "by weight of one layer" refers to the percentage of the ingredient by weight of the layer where it is present, rather than by weight of the whole container (unless, of course, the whole container is made by a single layer).

As used herein, when a composition is "substantially free" of a specific ingredient, it is meant that the composition comprises less than a trace amount, alternatively less than 0.1%, alternatively less than 0.01%, alternatively less than 0.001%, by weight of the composition of the specific ingredient.

As used herein, the articles including "a" and "an" when used in a claim, are understood to mean one or more of what is claimed or described.

As used herein, the terms "comprise", "comprises", "comprising", "include", "includes", "including", "contain", "contains", and "containing" are meant to be non-limiting, i.e., other steps and other ingredients which do not affect the end of result can be added. The above terms encompass the terms "consisting of" and "consisting essentially of".

Blow Molding Mold

At least a portion of the blow molding mold herein has a SPI finish standard selected from the group consisting of A-1, A-2, A-3, B-1, B-2, and B-3. Preferably, the portion of the mold has a SPI finish standard selected from the group consisting of A-1, A-2, and A -3. The person skilled in the art understands the Ra value of a mold finish represented by a specific SPI finish standard. For example, a SPI finish standard of A-2 represents a Ra Value of about 30 nm, a SPI finish standard of B-2 represents a Ra Value of about 50 nm, a SPI finish standard of C-2 represents a Ra Value of about 100 nm, and a SPI finish standard of D-2 represents a Ra Value of about 300 nm. In one embodiment, the mold is not sandblasted, preferably the mold is polished but not sandblasted.

In one embodiment, the whole mold has one single SPI finish standard, i.e., different portions of the inner surface of the mold have the same or similar Ra values. Alternatively, the inner surface of the mold has a first portion and a second portion, wherein the first portion has a higher grade of smoothness in terms of SPI finish standard than the second portion. For example, the upper half of the mold has a SPI finish standard of A-3, and the lower half of the mold has a SPI finish standard of B-1. Another example, the inner surface of the mold has three portions: an upper portion, a middle portion, and a lower portion, and the upper portion and the lower portion have a SPI finish standard of A-3, and the middle portion has a SPI finish standard of A-1Preferably, the first portion that has a higher grade of smoothness is printed with pictures, product logos, or text, preferably product logos, thus attracting users' attention.

The mold herein could be made of any suitable material known in the art, including but not limited to: aluminium, aluminium alloy, copper, copper alloy, and steel. The preferably material for making the mold is aluminium or its alloy.

Blow Molding Process

The blow molding process of the present invention comprises the steps of: a) affixing a precursor container form into a blow molding mold; and b) blowing into the precursor container form as to expand the precursor container form against the inner surface of the mold thereby forming the blow molded container.

In one embodiment, the process herein further comprises the step of forming the precursor container form prior to step a). This step of forming the precursor container form is carried out by mixing the thermoplastic material and additive to form a blow mold blend, and then injecting or extruding the blow mold blend to form the precursor container form.

In terms of forming the blow mold blend, in one embodiment, the process herein comprises the step of first mixing the additive and a carrier to form a masterbatch, and then mixing the masterbatch with the thermoplastic material to form a blow mold blend. The masterbatch is typically formed by: mixing the carrier and additive under ambient temperature; extruding the mixture of the carrier and additive in an extruder (e.g., a twin screw extruder) to form pellets; and then cooling the pellets in a water bath to form the masterbatch. The step of mixing the carrier and additive is preferably operated under ambient temperature to minimize chemical bonding between the additive and the carrier. Then, the masterbatch is mixed with the thermoplastic material to form the blow mold blend, i.e., the additive is added into the thermoplastic material via a masterbatch. The masterbatch may comprise certain adjunct ingredients (e.g., colorants). For example, the masterbatch can be a color masterbatch used for providing color to a container. The carrier herein may be a different material from the thermoplastic material or the same material as the thermoplastic material. Preferably the carrier is the same material as the thermoplastic material, thereby reducing the number of types of thermoplastic material in the formed container and allowing ease and efficiency of recycling. Preferably, the masterbatch comprises from about 10% to about 30%, alternatively from about 10% to about 25%, alternatively from about 12% to about 20%, by weight of the masterbatch, of the additive.

Alternatively, the additive is added into the thermoplastic material directly, i.e., without forming a masterbatch. The combination of the additive and the thermoplastic material is preferably uniformly mixed to form the blow mold blend.

In terms of forming the precursor container from the blow mold blend, preferably the blow mold blend is injected to form the precursor container form, and the precursor container form is a preform. The injected preform is typically followed by a blow molding process (i.e., IBM) or a stretch blow molding process (i.e., ISBM). Alternatively, the blow mold blend is extruded to form the precursor container form, and the precursor container form is a parison. The extruded parison is typically followed by a blow molding process (i.e., EBM). The parison execution is preferred because this is the main precursor container form for both PE and PP, i.e., the EBM process is preferred.

In the parison execution, the EBM process may be either continuous or intermittent depending on how the parison is formed. In continuous EBM, the parison is extruded continuously from an extrusion die and individual parts are cut off (e.g., by a suitable knife) In intermittent EBM, the plastic is melted by an extruder when it passes through the extruder, and then the melted plastic is pushed by a rod to form a parison, i.e., parisons are formed individually. The continuous EBM is preferred. In the continuous EBM, the extrusion die comprises a die and a pin for forming a parison from the melted plastic. The pin is located inside the die and extending axially of the die, and there is a die gap between the die and the pin. The melted plastic passes through the die gap and forms a parison when exiting the die. The die, the pin, and the die gap together determine the final shape and size of the extruded parison. Preferably, the die and pin are concentric, thereby forming a desired parison having an even thickness distribution. In the art, die swell is a challenging issue as it causes fractures formed in the parison as well as the blown container. The term "die swell" herein refers to a common phenomenon that the extruded parison partially recover or "swell" back to the former shape and volume of the material after exiting the die. However, in the present invention, it has been surprisingly found that the addition of the additive mitigates the die swell significantly. Without wishing to be bound by theory, it is believed that this is mainly the result of the relatively low surface tension of the additive. Another challenge is die scratch, i.e., the sticking of the material onto the die. The accumulation of the material onto the die would eventually deform the extruded parison and the blown container. By contrast, in the present invention, due to its relatively low surface tension, the additive reduces the tendency of the material sticking onto the die, i.e., mitigating the die scratch issue.

The thermoplastic material and additive of the present invention can be processed under any suitable processing temperature. In the parison execution, in step b) the blowing into the parison as to expand the parison is preferably at a processing temperature of from 130 to 200° C., more preferably from 150 to 190° C. Alternatively, as aforementioned, the thermoplastic material and additive herein can be processed under higher processing temperature due to the isolation function provided by the additive. In this alternative embodiment, in step b), the blowing into the parison as to expand the parison is at a processing temperature of from about 200 to 300° C., alternatively from about 230 to 300° C., alternatively from about 250 to 300° C.

In terms of blowing pressure (i.e., the pressure inside the expanding precursor container form during the blow step), in step b), preferably the blowing into the precursor container form as to expand the precursor container form is at a blowing pressure of about 0.1 to 2 Mpa, alternatively from about 0.2 to about 1.8 Mpa, alternatively from about 0.4 to 1.5 Mpa. In an EBM execution, the blowing pressure is preferably from about 0.2 to about 1.8 Mpa, alternatively from about 0.4 to about 1.5 Mpa. In the art, the blowing pressure in EBM is relatively low, compared to other types of blow molding such as ISBM. By contrast, according to the present invention, the EBM process allows for a higher blowing pressure along with the increased processing temperature. This higher blowing pressure pushes the precursor container form harder against the inner surface of the mold, thereby obtaining a smoother exterior surface of the formed container.

In one embodiment, the process herein further comprises the step of cooling the blown container. In this execution, the higher processing temperature enables a faster cooling rate, which leads to reduced crystallinity of the material. Such reduced crystallinity further results in improved surface smoothness of the formed container. In the blow molding process, there is typically a sharp drop in the material temperature when the material touches the mold. Typically, the material temperature is around the processing temperature, and the mold temperature is from about 10 to 30° C. Thus, the material is cooled by the mold and finally achieves a temperature equal to or slightly higher than the mold temperature. The cooling rate is defined by the temperature decrease of the material during the cooling divided by cooling time. Typically the cooling time of a blow molding system is fixed, and thus a larger temperature decrease (enabled by a higher processing temperature) means a faster cooling rate, which is desired in terms of a reduced crystallinity. In one embodiment, the blown container is cooled down at a cooling rate of from about 10 to about 30° C./sec, preferably from about 20 to about 30° C./sec. Also, it is understood that the cooling rate is related to the size of the formed container, i.e., the cooling rate for a larger container is typically slower than the cooling rate for a smaller container.

Container

The container of the present invention is obtained according to the blow molding process as descried herein. The container comprises a layer that comprises the thermoplastic material and additive as described herein. The term "container" herein refers to packaging suitable for containing compositions. The compositions contained in the container may be any of a variety of compositions including, but not limited to, detergents (e.g., laundry care, dish care, skin and hair care), beverages, powders, paper (e.g., tissues, wipes), beauty care compositions (e.g., cosmetics, lotions), medicinal, oral care (e.g., tooth paste, mouth wash), and the like. The compositions may be liquid, semi-liquid, solid, semi-solid, gel, emulsion, aerosol, foam, gaseous, or a combination thereof. The container may be used to store, transport, or dispense compositions contained therein. Non-limiting volumes containable within the container are from 10 ml to 5000 ml, alternatively from 100 ml to 4000 ml, alternatively from 500 ml to 1500 ml, alternatively 1000 ml to 1500 ml. The container may include a closure or dispenser or pump. The term "container" is used herein to broadly include these elements of a container. Non-limiting examples of containers include a bottle, tube, jar, cup, cap, clam shell, bag, sachet, and the like.

Due to the use of a smooth mold, the container of the present invention has an exterior surface with improved smoothness. In one embodiment, an exterior surface of the container has a Ra Value of from about 10 nm to about 500 nm, alternatively from about 20 nm to about 400 nm, alternatively from about 30 nm to about 300 nm, alternatively from about 50 nm to about 250 nm, according to the test method for smoothness as described hereinafter in the present invention. In sharp contrast, due to the use of rough molds, containers made from thermoplastic materials having lower melting point (e.g., PE or PP) in the art typically have a Ra Value of from about 500 nm to about 2000 nm The container herein can comprise one single layer or multiple layers. In one embodiment, the container comprises multiple layers of thermoplastic material comprising an outer layer and an inner layer. The inner layer is in nearer proximity to the composition contained in the container than the outer layer. The inner layer may make contact with the contained composition. The outer layer is further away in proximity to the composition contained in the container as compared to the inner layer. The outer layer may form the outermost surface of the container. Alternatively, one or more middle layers may be located in between the inner layer and the outer layer. When the outer layer and the inner layer comprise different thermoplastic materials, preferably an adhesive layer is positioned between the outer layer and the inner layer.

In a single layer execution, the thermoplastic material and additive as described herein are contained in this single layer of the container.

In a multi-layer execution, the container of the present invention comprises multiple layers, wherein at least one layer of the multiple layers comprises the thermoplastic material and additive as described herein. In one embodiment, the one layer comprising the thermoplastic material and additive as described herein is the outermost layer of the multiple layers (i.e., the exterior surface of the container). As such, the glossy appearance is visible to a user when viewing the container, e.g., on a store shelf. For example, the container is a three-layer container of BOPP (biaxially oriented polypropylene)/Adhesive/PE wherein the PE is the outermost layer, and the additive is present in the outermost PE layer. In an alternative example, the one layer comprising the thermoplastic material and additive as described herein is the inner layer of the multiple layers, and the outermost layer is transparent or at least substantially transparent or translucent, and so the glossy appearance is visible to a user by looking through the transparent or translucent outermost layer to the inner glossy layer of the container. Alternatively, each layer of the multiple layers comprises the thermoplastic material and additive as described herein. The multi-layer container is preferably made from a multi-layer parison or preform depending on types of blow molding.

Thermoplastic Material

The container of the present invention comprises a layer, and the layer comprises from about 86% to about 99.99%, alternatively from about 90% to about 99.8%, alternatively from about 95% to about 99.6%, by weight of one layer of the container, of a thermoplastic material. The thermoplastic material is selected from the group consisting of PE, PP, and a combination thereof. Preferably, the thermoplastic material is PP. Alternatively, the thermoplastic material is PE. More preferably, the PE is selected from the group consisting of high density polyethylene (HDPE), low density polyethylene (LDPE), linear low density polyethylene (LLDPE), and a combination thereof, but more preferably is HDPE.

In one embodiment, the thermoplastic material herein comprises a mixture of two or more types of thermoplastic materials. Preferably, the thermoplastic material comprises a mixture of PE or PP with a polymer selected from the group consisting of polybutylene terephthalate (PBT), polyethylene terephthalate (PET), polycarbonate (PC), acrylonitrile butadiene styrene (ABS), styrene butadiene copolymer (SBS), polyamide (PA), acrylonitrile-styrene copolymer (AS), styrene-butadiene block copolymer (SBC), polylactic acid (PLA), and a combination thereof. When two or more types of the abovementioned thermoplastic materials are used, it is preferred that one major thermoplastic material is used which constitutes at least about 86%, alternatively about 91%, alternatively about 95%, alternatively about 98%, by weight of the total mixture of the two or more types of the thermoplastic materials. Preferably, the major thermoplastic material is PE or PP, more preferably is PP.

Recycled thermoplastic materials can be used in the present invention. In one embodiment, the thermoplastic material includes a polymer selected from the group consisting of post-consumer recycled polyethylene (PCRPE); post-industrial recycled polyethylene (PIR-PE); regrind polyethylene; and a combination thereof. In the multi-layer execution, preferably the recycled thermoplastic material is in neither the outermost layer nor the innermost layer. For example, in a three-layer execution, the recycled thermoplastic material is in the middle layer of the three layers. The container of the present invention can be recycled as well.

The thermoplastic material herein may be formed by using a combination of monomers derived from renewable resources and monomers derived from non-renewable (e.g., petroleum) resources. For example, the thermoplastic material may comprise polymers made from bio-derived monomers in whole, or comprise polymers partly made from bio-derived monomers and partly made from petroleum-derived monomers.

Additive

The container of the present invention comprises a layer that comprises from about 0.01% to about 5% of an additive. In addition to mitigating an excessive temperature build-up of the material and reducing the tendency of the material sticking onto the mold as aforementioned, the addition of the additive increases the flowability of the material. Poor flowability typically leads to the formation of flow line defects, especially under lower processing temperature. By contrast, in the present invention, the increased flowability of the material rendered by the additive as well as the higher processing temperature mitigates the formation of flow line defects to the exterior surface of the formed container.

Preferably, in the layer of the container herein, the additive is present from about 0.03% to about 4%, more preferably from about 0.05% to about 3%, even more preferably from about 0.1% to about 2%, by weight of the layer, of an additive. The amount of the additive present in the layer is relatively low, thus allowing ease and efficiency of recycling. It is desired to reduce the amount of non-thermoplastic materials (e.g., pearlescent agents, colorants) in a container to improve the recyclability of the container in the prior art. However, traditionally a relatively high amount of non-thermoplastic materials is required to render a container with improved aesthetics. By contrast, in the present invention, applicant has surprisingly found that a recyclable, smooth container is obtained without having to require a relatively high amount of non-thermoplastic materials.

A wide variety of additives are suitable for use herein provided they satisfy the Surface Tension requirement. The additive has a Surface Tension Value of from about 0.1 to about 50 m*N/m, alternatively from about 0.1 to about 40 m*N/m, alternatively from about 0.1 to about 30 m*N/m, alternatively from about 0.1 to about 27 m*N/m, alternatively from about 1 to about 25 m*N/m, alternatively from about 3 to about 22 m*N/m, alternatively from about 5 to about 20 m*N/m at a temperature of 25° C. The Surface Tension data of various additives are readily available from books and/or online databases. In addition to the parameters of Surface Tension, certain additives are selected as preferred due to characteristics including: state under ambient temperature (namely, liquid or solid or gas), odor characteristic, commercial availability, cost, etc.

Preferably, the additive is selected from the group consisting of an alcohol, oil, fluoropolymer, siloxane fluid, and a combination thereof.

In one embodiment, the additive is an alcohol. The alcohol is preferably selected from the group consisting of diol, triol, and a combination thereof. More preferably, the alcohol is selected from the group consisting of ethylene glycol, propylene glycol, glycerol, butanediol, poly(propylene glycol), derivatives thereof, and a combination thereof. In one preferred embodiment, the additive is poly(propylene glycol).

In an alternative embodiment, the additive is an oil selected from the group consisting of a plant oil, an animal oil, a petroleum-derived oil, and a combination thereof. For example, the additive could be an animal oil selected from the group consisting of tallow, lard, and a combination thereof. Preferably, the additive is a plant oil. The plant oil is preferably selected from sesame oil, soybean oil, peanut oil, olive oil, castor oil, cotton seed oil, palm oil, canola oil, safflower oil, sunflower oil, corn oil, tall oil, rice bran oil, derivatives thereof, and a combination thereof.

In another embodiment, the additive is a siloxane fluid. The siloxane fluid preferably has a viscosity of from about 20 cst to about 1,000,000 cst, alternatively from about 50 cst to about 50,000 cst, alternatively from about 350 cst to about 30,000 cst, alternatively from about 700 cst to about 20,000 cst, alternatively from about 1000 cst to about 10,000 cst at a temperature of 25° C. ASTM D-445 is used herein to measure the viscosity of a material having a viscosity from 20 cst to 1000 cst, and ASTM D-1084 Method B (for cup/spindle) and ASTM D-4287 (for cone/plate) are used to measure the viscosity of a material having a viscosity above 1000 cst.

In even yet another embodiment, the additive is a fluoropolymer. The term "fluoropolymer" herein refers to a fluorocarbon based polymer with multiple carbon-fluorine bonds. The fluoropolymer is characterized by a high resistance to solvents and acids and traditionally functions as a processing aid in a blow molding process. Non-limiting examples of the fluoropolymer include: polyvinyl fluoride, polyvinylidene fluoride, polytrifluoroethyelene, polytetrafluoroethylene (PTFE), polyhexafluoropropylene, polychlorotrifluoroethylene, perfluoroalkoxy polymer, fluorinated ethylene propylene, polyethylenetetrafluoroethylene, polyethylenechlorotrifluoroethylene, perfluorinated elastomer, chlorotrifluoroethylene, chlorotrifluoroethylenevinylidene fluoride, perfluoropolyether, and perfluorosulfonic acid. One preferred example of the Fluoropolymer is PTFE, available under the name of Teflon® from Du Pont.

The additive herein is preferably in a liquid form under ambient temperature. Such a liquid additive, on the one hand, enables a more homogeneous blend with the thermoplastic material before the blow molding process, and on the other hand, significantly improves the surface smoothness of the container when located on the container's outer surface, versus pearlescent agents that are typically solid.

The additive herein may be either odorous or odorless. In one embodiment, the additive has an odor that matches the perfume of the composition contained in the container, thus attracting users when displayed on shelf or enhancing the perfume performance of the composition when being used. Alternatively, the additive is odorless and therefore does not adversely affect the perfume performance of the composition contained in the container.

The additive herein preferably has a relatively high flash point, alternatively has a flash point of greater than 100° C., alternatively from about 100° C. to about 500° C., alternatively from about 150° C. to about 400° C. The additive having a relatively high flash point, particularly having a flash point higher than the processing temperature conditions, is desired as it allows for a safer manufacturing process.

In a highly preferred embodiment, the container of the present invention comprises a layer, and the layer comprises from about 95% to about 99.8%, by weight of the layer, of PE; and from about 0.02% to about 3%, by weight of the layer, of a siloxane fluid having a viscosity of about 20 cst to about 1,000,000 cst at a temperature of 25° C., wherein the container is blow molded, preferably extrusion blow molded, in a mold having a SPI finish standard selected from the group consisting of A-1, A-2, A-3, B-1, B-2, and B-3. Most preferably, the thermoplastic material is HDPE.

In another highly preferred embodiment, the container of the present invention comprises a layer, and the layer comprises from about 95% to about 99.8%, by weight of the layer, of PP; and from about 0.02% to about 3%, by weight of the layer, of an additive, wherein the additive is selected from a group consisting of a siloxane fluid having a viscosity of about 20 cst to about 1,000,000 cst at a temperature of 25° C., glycerol, and a combination thereof, and wherein the container is blow molded, preferably extrusion blow molded, in a mold having a SPI finish standard selected from the group consisting of A-1, A-2, A-3, B-1, B-2, and B-3. Most preferably, the additive is a siloxane fluid having a viscosity of about 20 cst to about 1,000,000 cst at a temperature of 25° C.

In addition to the improved surface smoothness of the container, it has been surprisingly found that the added additive renders a glossy container by forming a micro-layering structure with the thermoplastic material. The term "glossy" herein refers to a pearl-like luster effect or metallic luster effect. The measurement method for the glossiness (i.e., glossy effect) of a container is described hereinafter. The term "micro-layering structure" herein refers to micro-layers of the thermoplastic material in lamellar form interspersed with micro-domains of the additive in one macro-layer of the container. The micro-layering structure, particularly the spaces between each micro-layer of the thermoplastic material and between the micro-domains of the interspersed additive, is on a nano-scale, preferably from about 1-5 nanometers to about 100-500 nanometers. Without wishing to be bound by theory, it is believed that the micro-layering structure is formed due to the immiscibility between the additive and thermoplastic material and the stretching of the material in the blow molding process. A light interference effect is produced by this micro-layering structure by light entering this micro-layering structure and reflecting and refracting within the structure when striking the micro-layers of thermoplastic material as well as the micro-domains of additive. It is the light interference effect that provides a glossy appearance. In terms of glossiness, the container of the present invention preferably has a Glossiness Value of from 70 to 130, alternatively from 75 to 110, according to the test method for glossiness as described hereinafter in the present invention. The container herein preferably delivers a better glossy effect, more preferably delivers a Glossiness Value of at least 5 more, than those containers made from same materials with a rough mold, according to the test method for glossiness as described hereinafter in the present invention. When the glossiness data of two samples are compared, a difference of −5/+5 represents a difference that is user noticeable.

Adjunct Ingredient

The container of the present invention may comprise an adjunct ingredient. Preferably, the adjunct ingredient is present in an amount of from about 0.0001% to about 9%, alternatively from about 0.0001% to about 5%, alternatively from about 0.0001% to about 1%, by weight of the one layer of the container, of the adjunct ingredient. Non-limiting examples of the adjunct ingredient include: pearlescent agent, filler, cure agent, anti-static agent, lubricant, UV stabilizer, anti-oxidant, anti-block agent, catalyst stabilizer, colorant, nucleating agent, and a combination thereof. Alternatively, the container is free of or substantially free of one or more of these adjunct ingredients.

As aforementioned, a glossy container is obtainable provided that if the added additive or adjunct ingredient is immiscible with the thermoplastic material, i.e., the additive or adjunct ingredient has a sufficiently different value of Solubility Parameter versus the unmodified thermoplastic material. The term "Solubility Parameter ($\delta$)" herein provides a numerical estimate of the degree of interaction between materials, and a Solubility Parameter difference between materials indicates miscibility of the materials. In one embodiment, the container herein comprises an adjunct ingredient, the adjunct ingredient and the thermoplastic material have a Solubility Parameter difference of at least about $0.5$ $cal^{1/2}$ $cm^{-3/2}$, alternatively from about $0.5$ $cal^{1/2}$ $cm^{-3/2}$ to about $20$ $cal^{1/2}$ $cm^{-3/2}$, alternatively from about $1$ cal to about $18$ $cal^{1/2}$ $cm^{-3/2}$, alternatively from about $3$ $cal^{1/2}$ $cm^{-3/2}$ to about $15$ $cal^{1/2}$ $cm^{-3/2}$, alternatively from about $5$ $cal^{1/2}$ $cm^{-3/2}$ to about $12$ $cal$ $cm^{-3/2}$.

Use of Mold

In one aspect, the present invention is directed to the use of a mold for blow molding a PE container, wherein at least a portion of said mold has a SPI finish standard selected from the group consisting of A-1, A-2, A-3, B-1, B-2, and B-3. Preferably, the portion of the mold has a SPI finish standard selected from the group consisting of A-1, A-2, and A-3.

Traditionally, containers made from different thermoplastic materials require differences in mold finish, depending on factors including ventilation requirement, melting point of the material, material shrinkage, blow molding type, etc. Particularly, in the art a rough mold having a finish standard of C or D is necessarily required to produce a PE container. By contrast, in the present invention, PE containers can be processed in a smooth mold having a finish standard of A or B, thereby leading to PE containers with improved surface smoothness.

Moreover, traditionally it is almost impossible in the art to produce a variety of containers from different thermoplastic materials by the same mold. PP and PE require relatively rough molds having a finish standard of C or D (in certain particular situations, PP can be processed in a smooth mold having a finish standard of A or B), while PET uses smooth molds having a finish standard of A or B. However, in the present invention, this issue associated with limited applications of a mold is resolved. The use of a smooth mold means the capability of using the same mold for making various containers, e.g., use a smooth mold for making PE, PP, and PET containers. This would significantly increase the production efficiency of molded containers.

Surface Tension

The Surface Tension data of various additives are readily available from books and/or online databases. The Surface Tension Values of certain preferred additives at a temperature of 25° C. are listed in Table 1.

TABLE 1

| Substance | Surface Tension (m*N/m) |
| --- | --- |
| Siloxane fluid | 21 |
| Poly(propylene glycol) | 21.7 |
| PTFE | 18-20 |
| Butanediol | 37.8 |
| Oliver oil | 33 |
| Castor oil | 40.5 |
| Glycerol | 48.4 |

Test Method

Smoothness

The surface smoothness of a container can be characterized by Roughness Average (Ra). The Ra Value is measured by MarSuf M400 supplied by Mahr. It is set at a contact mode for the roughness measurement. Data is collected as the average value of 10 spots within a detection area (i.e., a surface).

The Ra Value measured in nm can be represented by arithmetic mean value of the absolute height $y_i$ in vertical direction at specific position i. The Ra Value is represented as:

$$R_a = \frac{1}{n}\sum_{i=1}^{n} |y_i| \quad (3)$$

The Ra Value increases with the roughness.

Glossiness

An active polarization camera system called SAMBA is used to measure the specular glossiness of the present container. The system is provided by Bossa Nova Technologies and a polarization imaging software named VAS (Visual Appearance Study software, version 3.5) is used for the analysis. The front labeling panel part of the container is tested against an incident light. An exposure time of 55 sec is used.

The incident light is reflected and scattered by the container. The specular reflected light keeps the same polarization as the incident light and the volume scattered light becomes un-polarized. SAMBA acquires the polarization state of a parallel image intensity (P) contributed by both the reflected and scattered light, and a crossed image intensity (C) of the image contributed only by the scattered light. This allows the calculation of glossiness G given by G=P–C.

Micro-Layering Structure

The micro-layering structure of the thermoplastic material micro-layers interspersed with the additive micro-domains can be observed via Scanning Electron Microscope (SEM) by scanning of the cross-section view of the container microscopically. A HITACHI S-4800 SEM system is used.

EXAMPLE

The Examples herein are meant to exemplify the present invention but are not used to limit or otherwise define the scope of the present invention. Examples 1-11 are examples according to the present invention, and Examples 12 and 13 are comparative examples.

Examples 1-7

One-Layer Containers

The following containers shown in Table 2 are made of the listed ingredients in the listed proportions in weight percentage (wt %).

TABLE 2

|  | 1 | 2 | 3 | 4 | 5 | 6 | 7 |
|---|---|---|---|---|---|---|---|
| HDPE a | 99.8 | 0 | 0 | 0 | 0 | 99.6 | 0 |
| LDPE b | 0 | 99.8 | 99.6 | 0 | 0 | 0 | 0 |
| LLDPE c | 0 | 0 | 0 | 99.8 | 99.6 | 0 | 0 |
| PP d | 0 | 0 | 0 | 0 | 0 | 0 | 99.6 |

TABLE 2-continued

|  | 1 | 2 | 3 | 4 | 5 | 6 | 7 |
|---|---|---|---|---|---|---|---|
| Siloxane fluid e | 0.2 | 0 | 0 | 0 | 0 | 0.4 | 0 |
| Ethylene glycol | 0 | 0.2 | 0 | 0 | 0 | 0 | 0 |
| Sesame oil | 0 | 0 | 0.3 | 0 | 0.4 | 0 | 0 |
| Glycerol | 0 | 0 | 0 | 0 | 0 | 0 | 0.4 |
| PTFE f | 0 | 0 | 0 | 0.2 | 0 | 0 | 0 |
| Colorant | 0 | 0 | 0.1 | 0 | 0 | 0 | 0 | a commercially available under the name of Hostalen ACP5831D from Basell
b commercially available under the name of LDPE 868 from Sinopec
c commercially available under the name of LLDPE 2036P from Dow
d commercially available under the name of PP ST611 from Lee Chang Yung Chemical Industry Corp
e Polydimethylsiloxanes (at four viscosities 10 cst, 1,000 cst, and 60,000 cst, 1,000,000 cst), commercially available under XIAMETER PMX-200 siloxane fluid from Dow Corning
f polytetrafluoroethylene, commercially available under the name of Teflon ® from Du Pont Examples 8-9

Multi-Layer Containers

The following multi-layer containers shown in Table 3 are made of the listed ingredients in the listed proportions in wt %. The weight percentage herein refers to the percentage of the ingredient by weight of the layer where it is present, rather than by weight of the whole container. The outermost layer is the layer according to the present invention.

TABLE 3

|  |  | 8 | 9 |
|---|---|---|---|
| Outermost layer | HDPE a | 99.8 | 0 |
|  | LDPE b | 0 | 99.8 |
|  | Siloxane fluid c | 0.2 | 0 |
|  | Fluoropolymer d | 0 | 0.2 |
| Middle layer | Adhesive | None | 100 |
|  | PCRPE | 99.9 | None |
|  | Siloxane fluid c | 0.1 | None |
| Innermost layer | HDPE a | 100 | 0 |
|  | PP e | 0 | 100 | a commercially available under the name of Hostalen ACP5831D from Basell
b commercially available under the name of LDPE 868 from Sinopec
c Polydimethylsiloxanes (at viscosity of 1,000 cst), commercially available under XIAMETER PMX-200 siloxane fluid from Dow Corning
d polytetrafluoroethylene, commercially available under the name of Teflon ® from Du Pont
e commercially available under the name of PP ST611 from Lee Chang Yung Chemical Industry Corp Processes for Making the Container of Example 1

The container of Example 1 is manufactured by the following steps:

a) adding siloxane fluid into a carrier of HDPE under ambient temperature to form a mixture, and then extruding the mixture of siloxane fluid and HDPE in a twin screw extruder at a temperature of 200° C. to form pellets. Cooling the pellets in a water batch at about 20° C. for 0.5 min to form a masterbatch. The siloxane fluid is present in an amount of 10% by weight of the masterbatch. The twin screw extruder has an extruder length/diameter (L/D) of 43 and diameter of 35.6 mm;

b) drying the masterbatch and extra HDPE, separately, for 3-4 hours under 120-125° C. Mixing the dried masterbatch and the dried extra HDPE at a let-down ratio of about 0.8% to 8% under ambient temperature to form a blow mold blend;

c) melting the blow mold blend and extruding it into a parison, under a temperature of 180° C. and at an extrusion speed of 60-70 mm/s; and d) Heating and softening the parison with an infrared heating machine at 70-90° C. for 2 minutes. Affixing the softened parison into a blow molding mold. The bottle mold has a SIP finish standard of A-3. Blowing into the parison under a blowing pressure of 0.6 Mpa and at a processing temperature of 250° C. by using a blow machine Type CP03-220 from Guangzhou RiJing Inc. The air pushes the parison to expand against the inner surface of the mold. The mold temperature is 25° C., and the blown container is cooled by the mold at a cooling rate of 25° C./sec. Ejecting the blown container out of the mold after it is cooled down, wherein in the blow mold blend, each ingredient is present in the amount as specified for Example 1 in Table 2.

Processes of Making the Containers of Examples 2-7

The containers of Examples 2-7 are manufactured by the same steps as making the container of Example 1, except for that the specific types of the thermoplastic material, additive, and adjunct ingredient (if any), and the amounts thereof are different, as specified for Examples 2-7 in Table 2. When present, a colorant is added into the carrier together with the additive to form the masterbatch in step a).

Processes of Making the Containers of Examples 8-9

The containers of Examples 8-9 are manufactured by the same steps as making the container of Example 1, except for that: 1) the specific types of the thermoplastic material and additive, and the amounts thereof are different, as specified for Examples 8-10 in Table 3; and 2) the parisons of Example 8-9 obtained in step c) are three-layer parisons having an outermost layer, a middle layer, and an innermost layer. Each layer consists of the ingredients listed for that layer as specified in Table 3.

Examples 10-13

One-Layer Containers

The following containers shown in Table 4 are made of the listed ingredients in the listed proportions in weight percentage (wt %) and are molded in a mold having the indicated SPI finish standard.

TABLE 4

|  | 10 | 11 | Comparative 12 | Comparative 13 |
|---|---|---|---|---|
| PP a | 99.5 | 99.5 | 99.5 | 99.5 |
| Siloxane fluid b | 0.5 | 0 | 0.5 | 0 |
| Glycerol | 0 | 0.5 | 0 | 0.5 |
| Mold finish | A-1 | A-1 | C-2 | C-2 | a commercially available under the name of PP ST611 from Lee Chang Yung Chemical Industry Corp
b Polydimethylsiloxanes (at a viscosity of 1,000 cst), commercially available under XIAMETER PMX-200 siloxane fluid from Dow Corning Processes of Making the Containers of Examples 10-13

The containers of Examples 10-11 are manufactured by the same steps as making the container of Example 1, except for that: the specific types of the thermoplastic material, additive, and adjunct ingredient (if any), and the amounts thereof are different, as specified for Examples 10-11 in Table 4, in step d) the blowing pressure is 0.1 Mpa and the processing temperature is 180° C., and the mold machine Type is B07 from Kai Mei Machinery Co., Ltd and has a SIP finish standard of A-1.

The containers of Comparative Examples 12-13 are manufactured by the same steps as making the containers of Examples 10-11, respectively, except for that: the mold has a SIP finish standard of C-2.

Comparative Data on Glossiness

Comparative experiments of assessing the glossiness of containers of Examples 10-11 and Comparative Examples 12-13 are conducted. The glossiness is measured according to the method for glossiness as described hereinabove and characterized as a Glossiness Value. Table 5 below demonstrates the Glossiness Values of the containers.

TABLE 5

| Example | 10 | 11 | Comparative 12 | Comparative 13 |
|---|---|---|---|---|
| Glossiness Value | 75 | 73 | 62 | 67 |

As shown in Table 5, the containers according to the present invention (Examples 10-11) demonstrate improved glossiness over the containers of comparative examples (Examples 12-13).

Comparative Data on Smoothness

Comparative experiments of assessing the smoothness of containers of Example 11 and Comparative Examples 13 are conducted. The smoothness is measured according to the method for smoothness as described hereinabove and characterized as a Roughness Average (Ra). Table 6 below demonstrates the Ra values of the containers.

TABLE 6

| Example | 11 | Comparative 13 |
|---|---|---|
| Ra Value | 220 nm | 680 nm |

As shown in Table 6, the container according to the present invention (Example 11) demonstrates improved smoothness over the container of comparative example (Example 13).

Unless otherwise indicated, all percentages, ratios, and proportions are calculated based on weight of the total composition. All temperatures are in degrees Celsius (° C.) unless otherwise indicated. All measurements made are at 25° C., unless otherwise designated. All component or composition levels are in reference to the active level of that component or composition, and are exclusive of impurities, for example, residual solvents or by-products, which may be present in commercially available sources.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A blow molding process of making a container, comprising the steps of:
    a) affixing a precursor container form into a blow molding mold, wherein said precursor container form is a parison or preform,
        i) wherein said precursor container form comprises a layer, wherein said layer comprises:
            1) from about 86% to about 99.99%, by weight of said layer, of a thermoplastic material selected from the group consisting of polyethylene (PE), polypropylene (PP), and a combination thereof; and
            2) from about 0.01% to about 5%, by weight of said layer, of an additive, wherein said additive has a Surface Tension Value of from about 0.1 to about 50 m*N/m; and
        ii) wherein said mold comprises an inner surface configured to receive the expandable precursor container form, wherein at least a portion of said mold has a SPI finish standard selected from the group consisting of A-1, A-2, A-3, B-1, B-2, and B -3; and
    b) blowing into said precursor container form as to expand said precursor container form against said inner surface of said mold thereby forming the container.

2. The process according to claim 1, wherein said portion of said mold has a SPI finish standard selected from the group consisting of A-1, A-2, and A-3.

3. The process according to claim 1, wherein said mold is not sandblasted.

4. The process according to claim 1, wherein said inner surface of said mold has a first portion and a second portion, wherein said first portion has a higher grade of smoothness in terms of SPI finish standard than said second portion.

5. The process according to claim 1, further comprising the step of forming said precursor container form by mixing said thermoplastic material and said additive to form a blow mold blend, and then extruding said blow mold blend to form said precursor container form, wherein said precursor container form is a parison.

6. The process according to claim 5, further comprising the step of first mixing said additive with a carrier to form a masterbatch, and then mixing said masterbatch with said thermoplastic material to form a blow mold blend, wherein said masterbatch comprises from about 10% to about 30%, by weight of said masterbatch, of said additive, and wherein said carrier is the same material as said thermoplastic material.

7. The process according to claim 1, wherein said precursor container form comprises multiple layers, wherein said layer of claim 1 is the outermost layer of said multiple layers.

8. The process according to claim 1, wherein said thermoplastic material is PP.

9. The process according to claim 1, wherein said additive is selected from the group consisting of an alcohol, oil, fluoropolymer, siloxane fluid, and a combination thereof.

10. The process according to claim 1, wherein said additive is an alcohol selected from the group consisting of ethylene glycol, propylene glycol, glycerol, butanediol, poly (propylene glycol), derivatives thereof, and a combination thereof.

11. The process according to claim 1, wherein said additive is a plant oil selected from the group consisting of sesame oil, soybean oil, peanut oil, olive oil, castor oil, cotton seed oil, palm oil, canola oil, safflower oil, sunflower oil, corn oil, tall oil, rice bran oil, derivatives thereof, and a combination thereof.

12. The process according to claim 1, wherein said additive is a fluoropolymer or a siloxane fluid having a viscosity of about 20 cst to about 1,000,000 cst at a temperature of 25° C.

* * * * *